UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

PROCESS OF PURIFYING ALUMINOUS MATERIALS.

1,310,342.            Specification of Letters Patent.      Patented July 15, 1919.

No Drawing.      Application filed December 5, 1918. Serial No. 265,347.

*To all whom it may concern:*

Be it known that I, OTIS HUTCHINS, a citizen of the United States, residing at Niagara Falls, in the county of Niagara and State of New York, have invented a new and useful Improvement in Processes of Purifying Aluminous Materials, of which the following is a full, clear, and exact description.

This invention relates to the production of an aluminous abrasive material of relatively high purity containing not over 1% each of iron oxid, titanium oxid and silica.

Crystalline fused alumina is ordinarily produced by the fusing in an electric furnace of various aluminous materials or ores, such as bauxite, emery or clay, a portion of the impurities or foreign material present in such ores, consisting mainly of iron oxid, silica, titanium oxid and lime, being reduced by the addition to the charge of a small percentage of carbon.

This ordinary aluminous abrasive product is well known and of wide utility, and contains from ninety-two to ninety-six per cent. of alumina, from two to four per cent. of titanium oxid, and lesser amounts of iron oxid and silica.

For certain purposes, however, an aluminous abrasive of higher purity is desirable, but it is well known by those versed in the art that great difficulty is encountered in manufacturing, from a low-grade aluminous ore, a satisfactory and uniform aluminous material containing over 97% alumina, by any of the well-known methods of manufacture. When enough carbon is introduced into the mix to cause a sufficient reduction of impurities to produce an aluminous abrasive of this purity, it has been found that the product obtained is always variable in composition. Portions of the product show too much reduction and reduction products of alumina and lime are to be found. Other portions of the product are not sufficiently reduced and contain considerable quantities of iron oxid, titanium oxid and silica. This difficulty is due to the inherent characteristics of this process and can be explained as follows:

In producing aluminous abrasives a mixture of bauxite and coke is charged into an electric furnace and melted by means of the electric current introduced into the furnace by means of carbon electrodes. As the material melts and comes in contact with the coke, the iron oxid, silica and some of the titanium oxid are reduced, forming an alloy which settles out to the bottom of the bath. As soon as this reduction is substantially completed, further charge mixture is introduced into the furnace. This second charge of material is practically fully reduced before the third charge is added and in this way the furance becomes eventually filled with the fused aluminous material. This procedure works exceedingly well when it is not attempted to carry the purity of the finished product above about 96% alumina. However, when it is endeavored to carry the purity up to and above 97%, non-uniformity of the product results. This is due to the fact that, when the aluminous charge, containing as it will a large amount of coke, is added to the furnace containing an aluminous bath in which the impurities are substantially reduced, some of the carbon of the mixture comes in contact with this highly reduced bath, forming reduction products of alumina and lime. These reduction products are not all subsequently oxidized by the oxids in the raw material with the result that portions of the bath are over-reduced and other portions are under-reduced. This non-uniform product is always encountered when it is attempted to carry out a large amount of purification in a single fusion.

I have discovered that it is possible to manufacture an aluminous material of high purity by a two-step process in which I limit the amount of purification to be done in the final fusion. In this way I have found it possible to produce an aluminous material containing upward of 97 per cent. alumina and which contains no detrimental reduction products and which does not disintegrate or give off gas when in contact with water.

The preferred method of carrying out my invention is as follows:

I fuse in an electric furance a mixture of calcined bauxite and coke, coke being present in a sufficient amount to produce a product containing at least 90 per cent. alumina. The product from this fusion is cooled, crushed and separated from the metallic impurities. It is then mixed with carbon and refurnaced, the carbon being in sufficient quantity to reduce the iron oxid, titanium oxid and silica to less than 1% each. It has been found that a very small proportion of carbon is sufficient for this final fusion, as a considerable amount of reduction is done by the carbon from the carbon electrodes. As a typical example of this process, I have used successfully the following materials:

Calcined bauxite,—analyzing as follows—

| | |
|---|---|
| $SiO_2$ | 6.85 |
| $Fe_2O_3$ | 9.90 |
| $TiO_2$ | 6.22 |
| $Al_2O_3$ | 76.70 | was mixed with coke in the proportion of 100 pounds of bauxite to 6 pounds of coke. This material was fused in an electric arc-furnace of the type commonly used in making aluminous abrasives. The resulting product analyzed as follows:

| | |
|---|---|
| $SiO_2$ | 1.60 |
| $Fe_2O_3$ | 3.56 |
| $TiO_2$ | 3.64 |
| $Al_2O_3$ | 90.97 |

This partially purified material was crushed and mixed in the proportions of 100 parts of the partially purified product to one part of coke and this mixture was re-fused in an electric furnace producing a product which analyzed as follows:

| | |
|---|---|
| $SiO_2$ | .30 |
| $Fe_2O_3$ | .62 |
| $TiO_2$ | .84 |
| $Al_2O_3$ | 98.00 |

While I have given these specific figures, I do not limit myself to the use of materials of this exact purity. For the raw material I may use any sort of aluminous ore such as bauxite, emery or clay, and I do not wish to limit myself to the exact amount of purification to be done in the first stage, but prefer that the purification be carried on to at least 90% alumina.

In carrying out the second step, in place of using the product of the first step as above described, I may use aluminous waste from the manufacture of aluminous abrasives, such as abrasive grains or fines. It has been the common practice to refurnace such material as might be considered waste material or material having a very limited market, for the production of the regular aluminous abrasive material analyzing from 92 to 96% alumina, or in other words, to obtain a product of substantially the same chemical composition as the material before refurnacing; but in this refurnacing an oxidizing agent, such as bauxite, iron oxid, or millscale, is added to neutralize any carbon from the electrodes or furnace hearth so that substantial reduction does not occur. My process differs fundamentally from this in the fact that my second step is always a reduction step and that in refurnacing and re-fusing the material, I always add carbon to carry the reduction to a further point.

Having thus described my invention—

I claim:

1. The process of purifying aluminous material, which consists in fusing the same in the presence of carbon insufficient in amount to reduce all the iron oxid, titanium oxid and silica contained therein, separating the aluminous product from the reduced impurities, and re-fusing said product in the presence of sufficient carbon to cause a further reduction of the iron oxid, titanium oxid and silica.

2. The process of purifying aluminous material, which consists in fusing the same in the presence of carbon insufficient in amount to reduce all the iron oxid, titanium oxid and silica contained therein, separating the aluminous product from the reduced impurities, and re-fusing said product in the presence of sufficient carbon to cause the production of an aluminous abrasive containing at least 97 per cent. of alumina.

3. In the process of purifying aluminous materials, the method which consists in fusing an aluminous material containing over 90 per cent. alumina, mixed with sufficient carbon to cause a sufficient reduction of the iron oxid, titanium oxid and silica to produce a product containing at least 97 per cent. of alumina.

4. The process of purifying aluminous material which consists in fusing the same in the presence of carbon insufficient in amount to reduce all the iron oxid, titanium oxid and silica contained therein, separating the aluminous product from the reduced impurities, and re-fusing said product in the presence of sufficient carbon to cause a reduction of the iron oxid, titanium oxid and silica to less than 1 per cent. each.

5. The step in the process of purifying aluminous materials which consists in fusing in an electric furnace aluminous material containing over 90 per cent. alumina, mixed with sufficient carbon to cause a reduction of the iron oxid, titanium oxid and silica to less than 1 per cent. each.

In testimony whereof, I have hereunto set my hand.

O. HUTCHINS.